United States Patent
Kumar et al.

(10) Patent No.: US 11,249,967 B1
(45) Date of Patent: Feb. 15, 2022

(54) DATABASE ACCESS PERFORMANCE IMPROVEMENT

(71) Applicant: International Business Machines Corporation, Armonk, NY (US)

(72) Inventors: Nirmal Kumar, Bangalore (IN); Pravin Kailashnath Kedia, Deonar (IN); Gaurav Mehrotra, Pune (IN); Jagadisha Bhat, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/983,044

(22) Filed: Aug. 3, 2020

(51) Int. Cl.
  *G06F 16/00* (2019.01)
  *G06F 16/21* (2019.01)
  *G06F 16/27* (2019.01)
  *G06F 16/245* (2019.01)

(52) U.S. Cl.
  CPC .......... *G06F 16/217* (2019.01); *G06F 16/245* (2019.01); *G06F 16/273* (2019.01)

(58) Field of Classification Search
  CPC ..... G06F 16/217; G06F 16/273; G06F 16/245
  USPC ........................................................ 707/803
  See application file for complete search history.

(56) References Cited

U.S. PATENT DOCUMENTS

| | | | | |
|---|---|---|---|---|
| 7,865,959 B1* | 1/2011 | Lewis | ................ | G06F 21/6218 726/26 |
| 8,364,648 B1* | 1/2013 | Sim-Tang | ........... | G06F 16/2358 707/674 |
| 8,666,942 B2* | 3/2014 | Ngo | .................... | G06F 11/2094 707/634 |
| 9,501,367 B2 | 11/2016 | Harrison et al. | | |
| 10,296,492 B2 | 5/2019 | Mason et al. | | |
| 10,545,957 B1 | 1/2020 | Winiarski | | |
| 10,628,270 B1* | 4/2020 | Bajaj | ................... | G06F 11/1451 |
| 10,936,545 B1* | 3/2021 | Chockalingam | .... | G06F 11/1448 |
| 2004/0034670 A1* | 2/2004 | Bhuyan | ................ | G06F 16/273 |
| 2013/0173543 A1 | 7/2013 | Barsness et al. | | |
| 2014/0149387 A1* | 5/2014 | Konik | ..................... | G06F 16/20 707/713 |
| 2014/0304824 A1* | 10/2014 | Sirohi | ................. | G06F 21/6227 726/26 |
| 2015/0227598 A1* | 8/2015 | Hahn | .................... | G06F 16/122 707/722 |

(Continued)

OTHER PUBLICATIONS

"Log Control Files: Db2 11.5", IBM Knowledge Center, Printed Apr. 5, 2020, 1 page, <https://www.ibm.com/support/knowledgecenter/en/SSEPGG_11.5.0/com.ibm.db2.luw.admin.ha.doc/doc/c0051340.html>.

(Continued)

*Primary Examiner* — Thanh-Ha Dang
(74) *Attorney, Agent, or Firm* — Sonny Z. Zhan (57) ABSTRACT

In an approach for database log management and log access performance improvement, a processor receives an access request for an optimal control file to minimize a database access performance impact. A processor determines the optimal control file based on usage of a plurality of control files for a database. A processor outputs the optimal control file to a user to access the database. A processor provides an incremental sub-control file of the optimal control file to the user. The incremental sub-control file is an incremental view of the optimal control file to query the incremental log data in the database.

11 Claims, 5 Drawing Sheets

(56) References Cited

U.S. PATENT DOCUMENTS

| | | | |
|---|---|---|---|
| 2015/0310044 A1* | 10/2015 | Isaacson | G06F 16/256 |
| | | | 707/613 |
| 2015/0378774 A1* | 12/2015 | Vermeulen | G06F 9/466 |
| | | | 707/703 |
| 2016/0019252 A1* | 1/2016 | Ducott, III | G06F 21/6218 |
| | | | 707/634 |
| 2017/0230376 A1* | 8/2017 | McEwen | G06F 9/50 |
| 2017/0322993 A1* | 11/2017 | Brodt | G06F 16/2358 |
| 2018/0095843 A1* | 4/2018 | Kedia | G06F 21/604 |
| 2018/0246947 A1* | 8/2018 | Florendo | G06F 16/273 |
| 2019/0179711 A1* | 6/2019 | Luo | G06F 11/1464 |

OTHER PUBLICATIONS

Hellerstein et al., "Architecture of a Database System", Foundations and TrendsR in Databases, vol. 1, No. 2 (2007), pp. 141-259.

Mell et al., "The NIST Definition of Cloud Computing", Recommendations of the National Institute of Standards and Technology, Special Publication 800-145, Sep. 2011, 7 pages.

\* cited by examiner

DATABASE ACCESS PERFORMANCE IMPROVEMENT

BACKGROUND

The present disclosure relates generally to the field of database management, and more particularly to database log management and log access performance improvement.

A database is an organized collection of data, generally stored and accessed electronically from a computer system. Databases may be developed using formal design and modeling techniques. A database management system may be computer software that interacts with end users, applications, and the database itself to capture and analyze data. External interaction with a database may be via an application program that interfaces with the database management system. The interaction can range from a database tool that allows users to execute queries textually or graphically, to a web site that happens to use a database to store and search information.

SUMMARY

Aspects of an embodiment of the present disclosure disclose an approach for database log management and log access performance improvement. A processor receives an access request for an optimal control file to minimize a database access performance impact. A processor determines the optimal control file based on usage of a plurality of control files for a database. A processor outputs the optimal control file to a user to access the database. A processor provides an incremental sub-control file of the optimal control file to the user. The incremental sub-control file is an incremental view of the optimal control file to query the incremental log data in the database.

DETAILED DESCRIPTION

The present disclosure is directed to systems and methods for database log management and log access performance improvement.

Embodiments of the present disclosure recognize a need to improve input/output log access performance when a database server is queried and updated by users. For example, embodiments of the present disclosure recognize a need to improve disk input/output log access performance due to reading of database control files by replication tools. In one or more embodiments, a control file may be a binary metadata file that contains database log information and records the physical structure of a database. A control file may be created at the same time when the database is created. At least one copy of the control file is created during the database creation. Two or more control files may be created during the database creation. Control files can be multiplexed in more than one location. Control files may contain information about the associated database and database logs that is required for log access by an instance, both at startup and during normal operation. Control files are available for writing by the database server whenever the database is open. Without a control file, a database cannot be mounted, and recovery is not possible.

In one or more embodiments, a control file may include one or more incremental sub-control files. The incremental sub-control files may be incremental view files of a control file. The incremental sub-control files may provide incremental control file information in a continuous manner so that incremental queries to the database server can get granular and filter to limited incremental log data. Embodiments of the present disclosure recognize querying an incremental sub-control file would be faster and more efficient than querying a complete control file. Therefore, the performance of input/output log access of the database server improves.

Embodiments of the present disclosure disclose determining a least used control file based on the control file usages. For example, a database server may manage to locate a control file based on the least usage of the control files dynamically based on the workloads. The usage of control files can be segregated for different purpose. For example, some of the control files can be arranged for a database production query usage. Some control files can be arranged for a database replication log query usage. Embodiments of the present disclosure disclose dynamically determining the least utilized control file based on the database query workload. Embodiments of the present disclosure disclose reading specifically reserved control files which are not utilized by other active workloads for a user. Embodiments of the present disclosure disclose querying a control file in either full or partial incremental manner.

Figure 1:
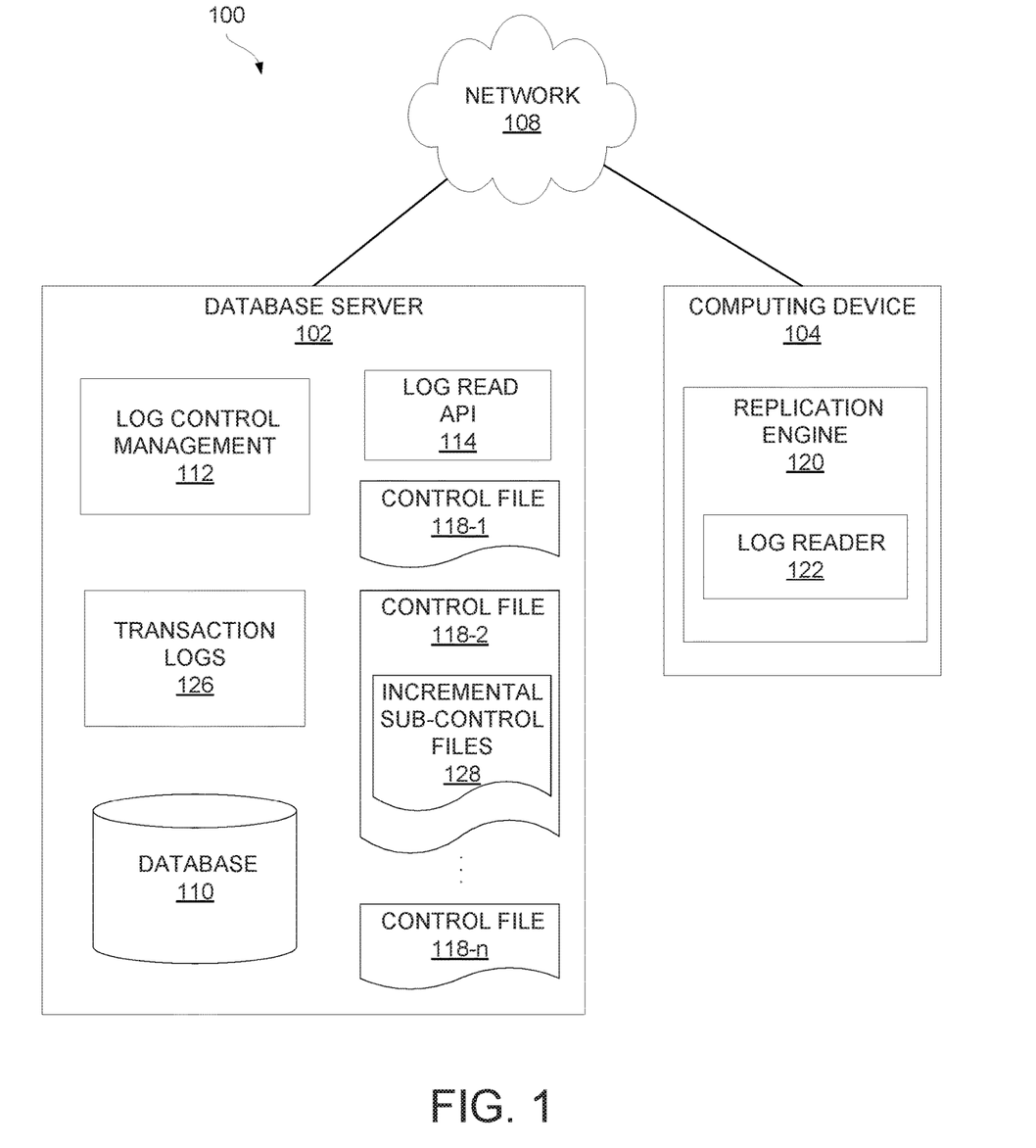
FIG. 1 is a functional block diagram illustrating a database log management and log access performance improvement environment, in accordance with an embodiment of the present disclosure.

The present disclosure will now be described in detail with reference to the Figures. FIG. 1 is a functional block diagram illustrating database log management and log access performance improvement environment, generally designated 100, in accordance with an embodiment of the present disclosure.

In the depicted embodiment, database log management and log access performance improvement environment 100 includes database server 102, computing device 104, and network 108.

In various embodiments of the present disclosure, computing device 104 may represent a replication solution that runs an agent which captures database changes and identifies the incremental database changes to target databases. The replication solution may provide low-impact capture and fast delivery of data changes for key information management initiatives including dynamic data warehousing, master data management, and application consolidations or migrations. Computing device 104 may help reduce processing overhead and network traffic by sending only the data that has changed. Computing device 104 may include a set of software design patterns used to determine and track the data that has changed so that action can be taken using the changed data. In some embodiments, computing device 104 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 104 represents a computing system utilizing clustered computers and components to act as a single pool of seamless resources. In other embodiments, computing device 104 may represent a server computing system utilizing multiple computers as a server system, such as in a cloud computing environment. Computing device 104 may include internal and external hardware components, as depicted and described in further detail with respect to FIG. 3.

Further, in the depicted embodiment, computing device 104 includes replication engine 120. In the depicted embodiment, replication engine 120 is located on computing device 104. However, in other embodiments, replication engine 120 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 104 and replication engine 120, in accordance with a desired embodiment of the disclosure.

In one or more embodiments, replication engine 120 may be a replication solution that captures incremental database changes and delivers the database changes to target databases. Replication engine 120 may be a software module that can send and receive replicated data. Replication engine 120 may operate as a source capture engine and a target engine simultaneously. In the depicted embodiment, replication engine 120 includes log reader 122. Log reader 122 is located on replication engine 120 and computing device 104. However, in other embodiments, log reader 122 may be located externally and accessed through a communication network such as network 108. Log reader 122 may act as a source-only log reader and a log parser component. Log reader 122 may interact log read API 114 in database server 102 for accessing database 110. Log read API 114 may be an application programming interface (API) that defines interactions between database server 102 and computing device 104, including interactions between log reader 122 in replication engine 120 and log control management 112. Log reader 122 may call log read API 114 to access control files 118-1-n and transaction logs 126. Log reader 122 may check and analyze transaction logs 126 in database 110. Log reader 122 may filter out tables that are not in scope for replication.

In various embodiments of the present disclosure, database server 102 can be a server that provides database services to other computer programs or computers, e.g., computing device 104. Users may access database server 102 through a front end running on the user's computer or through the back end, which runs on the server and handles tasks such as data analysis and storage. Database server 102 may be a relational database management system that delivers data to clients. A client may be an application that accesses database 110. In some embodiments, database server 102 may be a management server, a web server, or any other electronic device or computing system capable of processing program instructions and receiving and sending data. In some embodiments, database server 102 may be a laptop computer, a tablet computer, a netbook computer, a personal computer (PC), a desktop computer, or any programmable electronic device. In other embodiments, database server 102 may represent a server computing system utilizing multiple computers as a server system, such as in a cloud computing environment. In another embodiment, database server 102 represents a computing system utilizing clustered computers and components to act as a single pool of seamless resources. Database server 102 may include internal and external hardware components, as depicted and described in further detail with respect to FIG. 3.

In the depicted embodiment, database server 102 includes log control management 112, database 110, control files 118-1-n, transaction logs 126, and log read API 114. Database 110 may be datafiles that are physical files stored on disk. Datafiles may be used to store data on disk.

In one or more embodiments, control files 118-1-n may be binary files that contain database information and record the physical structure of database 110. Control files 118-1-n may be created at the same time as database 110. At least one copy of control files 118-1-n may be created during the database creation. Two or more control files 118-1-n may be created during database creation. Control files 118-1-n can be multiplexed in more than one location. Control files 118-1-n can be identical. Control files 118-1-n can be open concurrently and can be written for database 110. By storing multiple control files for a single database on different disks, database server 102 can safeguard against a single point of failure with respect to control files 118-1-n. If a single disk that contains a control file crashes, the current instance fails when database server 102 attempts to access the damaged control file. However, when other copies of the current control files, e.g., other copies of control files 118-1-n are available on different disks, an instance can be restarted without the need for database recovery. Control files 118-1-n may be updated continuously during database use. Control files 118-1-n may be updated to reflect a physical structure change of database 110. Control files 118-1-n may be associated with only one database 110. Control files 118-1-n may contain information about the associated database 110 that is required for access by an instance, both at startup and during normal operation. Control files 118-1-n can be available for writing by database server 102 whenever database 110 is open. Without control files 118-1-n, database 110 cannot be mounted and recovery is difficult. Among other things, control files 118-1-n may contain information including the database name, the timestamp of database creation, the names and locations of associated datafiles and log files, the log history, the current log sequence number, and checkpoint information. Control files 118-1-n may be enabled to be open concurrently and can be written for the same database. Control files 118-1-n may be stored for database 110 on different disks. If a single disk that contains a control file crashes, the current instance fails when accessing the damaged control file. However, when other copies of control files 118-1-n are available on different disks, an instance can be restarted without the need for database recovery.

In the depicted embodiment, control file 118-2 includes incremental sub-control files 128. In the depicted embodiment, it is shown that control file 118-2 includes incremental sub-control files 128. However, in other embodiments, each of control files 118-1-n may include incremental sub-control files 128 for each control file 118-1-n respectively. Incremental sub-control files 128 may be incremental view files of control file 118-2. Each of incremental sub-control files 128 together may represent complete control file 118-2. Incremental sub-control files 128 may provide incremental control file information in a continuous manner so that incremental queries can get granular and filter to limited incremental data. Querying one of incremental sub-control files 128 can be faster and more efficient than querying the entire control file 118-2.

In one or more embodiments, transaction logs 126 may be logs that records every transaction in database 110. Database server 102 may maintain transaction logs 126 for recovery purposes. Log reader 122 may inspect and read transaction logs 126 through log read API 114. In one or more embodiments, log read API 114 may be an API that defines interactions between database server 102 and computing device 104, including interactions between log reader 122 and log control management 112. Log reader 122 may call log read API 114 to locate control files 118-1-n through log control management 112. Log read API 114 may receive a call from log reader 122 in replication engine 120 to access control files 118-1-n and transaction logs 126. Log read API 114 may query log control management 112 to get the usage information of control files 118-1-n. Log read API 114 may request log control management 112 to provide optimal control files 118-1-n for replication without impacting database production performance. Log read API 114 may get the information of transaction logs 126 through log control management 112.

In one or more embodiments, log control management 112 may define, create, maintain and control access to database 110. Log control management 112 is located on database server 102. However, in other embodiments, log control management 112 may be located externally and accessed through a communication network such as network 108. Log control management 112 may recognize usage of control files 118-1-n. Log control management 112 may determine a least utilized control file and communicate to log read API 114. Log control management 112 may update a metadata history of log control management 112. Metadata of log control management 112 may represent the information about the relevant tables, mappings, subscriptions, notifications, events, and other particulars of log control management 112. Log control management 112 may have incremental control file information in the metadata which can be provided to log read API 114.

In one or more embodiments, log control management 112 is configured to receive an access request for an optimal control file to minimize a database access performance impact. Log control management 112 may monitor usage of control files 118-1-n for database 110. Database server 102 may be queried by log reader 122 in replication engine 120 through log read API 114 in database server 102. When replication engine 120 queries database server 102 to scrape transaction logs 126, replication engine 120 may go back to a first file of control files 118-1-n. Log control management 112 monitors usage of control files 118-1-n for database 110 based on the access frequency by users. Control files 118-1-n may be configured to be segregated based on the purposes of usage. For example, some of control files 118-1-n can be designated for database production usage. Some other control files 118-1-n can be designated for replication usage. Log control management 112 may recognize usage of each of control files 118-1-n. Log control management 112 may monitor usage of incremental sub-control files 128. For example, log control management 112 may monitor incremental sub-control files 128 that provide incremental control file information in a continuous manner so that incremental queries, e.g., from log reader 122 to transaction logs 126 and other information can get granular and filter to limited incremental data of transaction logs 126. Log read API 114 may accept parameters from log reader 122 to choose to provide the incremental data based on a replication bookmark so that log reader 122 does not have to query complete control file 118-2 each time. In one or more embodiments, log control management 112 is configured to receive a request to provide control files 118-1-n for log reader 122.

In one or more embodiments, log control management 112 is configured to determine an optimal control file based on usage of control files 118-1-n for database 110. Log control management 112 may determine a least used control file based on the control file usage. For example, log control management 112 may manage to dynamically locate a control file with the least usage. The usage of control files 118-1-n can be segregated for different purpose. For example, some of control files 118-1-n can be arranged for a database production usage. Some other control files 118-1-n can be arranged for a database replication usage. Log control management 112 may dynamically determine the least utilized control file based on the database query workloads. Log control management 112 may dynamically determine the least utilized control file based on specifically reserved control files which are not utilized by other active workloads. Control file 118-2 includes incremental sub-control files 128. Incremental sub-control files 128 may be incremental view files of control file 118-2. Incremental sub-control files 128 may provide incremental control file information in a continuous manner so that incremental queries, e.g., from log reader 122 to transaction logs 126 and other information can get granular and filter to limited incremental data of transaction logs 126. Log read API 114 may accept parameters from log reader 122 to choose to provide the incremental data based on a replication bookmark so that log reader 122 does not have to query complete control file 118-2 each time. If control file 118-2 has information for, e.g., 14 days log information and the replication bookmark is, for example, just one day old log file, seeking an incremental log file of last one day is much faster and more efficient than querying a 14 days log file. In the depicted embodiment, it is shown that control file 118-2 includes incremental sub-control files 128. However, in other embodiments, each of control files 118-1-n may include incremental sub-control files 128 for each control file respectively. Log control management 112 may query control files 118-1-n in either full or partial incremental manner.

In one or more embodiments, log control management 112 is configured to output an optimal control file to log reader 122 to access database through log read API 114. Log control management 112 may provide the determined control file name to log reader 122 through log read API 114. Log control management 112 may provide a metadata dictionary of incremental sub-control files 128 for log read API 114. Log control management 112 may return the control file name to log read API 114 and may provide the metadata dictionary for incremental sub-control files 128. In an example, log read API 114 may provide information of the determined control file 118-1-n to log reader 122. In another example, log read API 114 may provide information of the determined control file 118-1-n together with the information of incremental sub-control files 128 to log reader 122. Log reader 122 may receive information of the determined optimal control file from log read API 114 to access the logged history of database 110.

Figure 2:
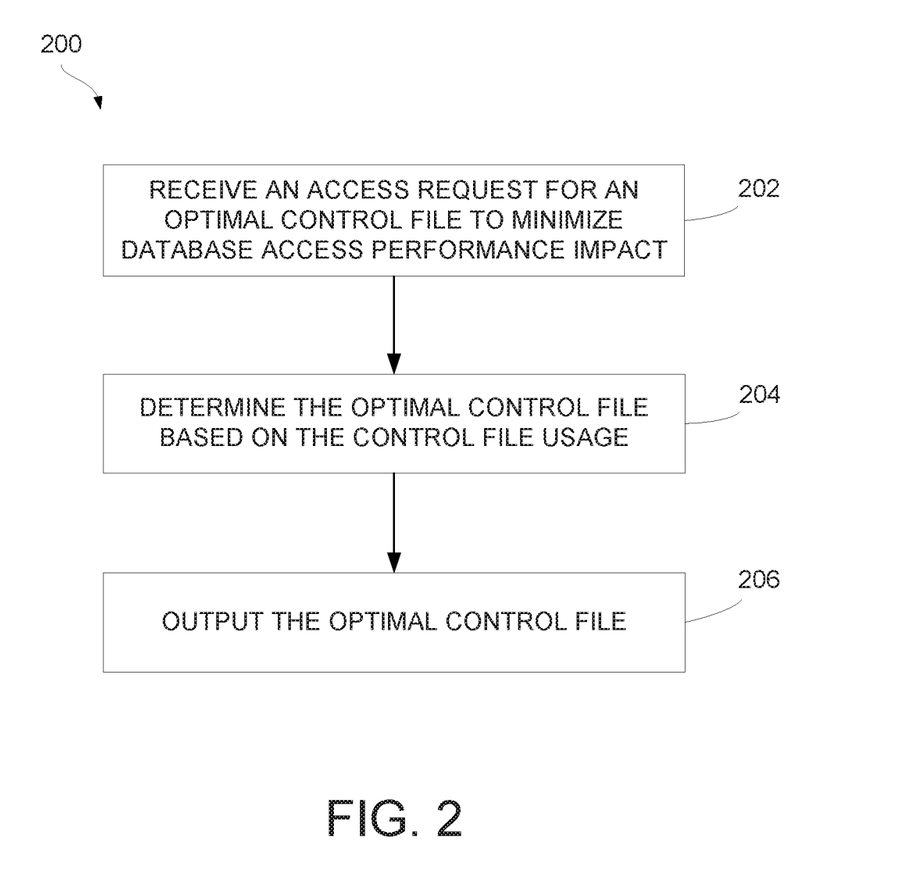
FIG. 2 is a flowchart depicting operational steps of a log control management within a database server of FIG. 1, in accordance with an embodiment of the present disclosure.

FIG. 2 is a flowchart 200 depicting operational steps of log control management 112 in database server 102 in accordance with an embodiment of the present disclosure.

Log control management 112 operates to receive an access request from log read API 114 for log reader 122 for an optimal control file to minimize a database access performance impact. Log control management 112 also operates to determine the optimal control file based on usage of control files 118-1-n for database 110. Log control management 112 also operates to output the optimal control file to log reader 122 to access database through log read API 114.

In step 202, log control management 112 receives an access request from log read API 114 for log reader 122 for an optimal control file to minimize a database access performance impact. Log control management 112 may monitor usage of control files 118-1-n for database 110. Database server 102 may be queried by log reader 122 in replication engine 120 through log read API 114 in database server 102. When replication engine 120 queries database server 102 to scrape transaction logs 126, replication engine 120 may go back to a first file of control files 118-1-n. Log control management 112 monitors usage of control files 118-1-n for database 110 based on the access frequency by users. Control files 118-1-n may be configured to be segregated based on the purposes of usage. For example, some of control files 118-1-n can be designated for database production usage. Some other control files 118-1-n can be designated for replication usage. Log control management 112 may recognize usage of each of control files 118-1-n. Log control management 112 may monitor usage of incremental sub-control files 128. For example, log control management 112 may monitor incremental sub-control files 128 that provide incremental control file information in a continuous manner so that incremental queries, e.g., from log reader 122 to transaction logs 126 and other information can get granular and filter to limited incremental data of transaction logs 126. Log read API may accept parameters from log reader 122 to choose to provide the incremental data based on a replication bookmark so that log reader 122 does not have to query complete control file 118-2 each time. In one or more embodiments, log control management 112 is configured to receive a request to provide control files 118-1-n for log reader 122.

In step 204, log control management 112 determines an optimal control file based on usage of control files 118-1-n for database 110. Log control management 112 may determine a least used control file based on the control file usages. For example, log control management 112 may manage to dynamically locate a control file with the least usage. The usage of control files 118-1-n can be segregated for different purpose. For example, some of control files 118-1-n can be arranged for a database production usage. Some other control files 118-1-n can be arranged for a database replication usage. Log control management 112 may dynamically determine the least utilized control file based on the database query workloads. Log control management 112 may dynamically determine the least utilized control file based on specifically reserved control files which are not utilized by other active workloads. Control file 118-2 includes incremental sub-control files 128. Incremental sub-control files 128 may be incremental view files of control file 118-2. Incremental sub-control files 128 may provide incremental control file information in a continuous manner so that incremental queries, e.g., from log reader 122 to transaction logs 126 and other information can get granular and filter to limited incremental data of transaction logs 126. Log read API 114 may accept parameters from log reader 122 to choose to provide the incremental data based on a replication bookmark so that log reader 122 does not have to query complete control file 118-2 each time. If control file 118-2 has information for, e.g., 14 days log information and the replication bookmark is, for example, just one day old log file, seeking an incremental log file of last one day is much faster and more efficient than querying a 14 days log file. In the depicted embodiment, it is shown that control file 118-2 includes incremental sub-control files 128. However, in other embodiments, each of control files 118-1-n may include incremental sub-control files 128 for each control file respectively. Log control management 112 may query control files 118-1-n in either full or partial incremental manner.

In step 206, log control management 112 outputs an optimal control file to log reader 122 to access database through log read API 114. Log control management 112 may provide information of the determined control file to log reader 122 through log read API 114. Log control management 112 may provide a metadata dictionary of incremental sub-control files 128 for log read API 114. Log control management 112 may return the control file name to log read API 114 and may provide the metadata dictionary for incremental sub-control files 128. In an example, log read API 114 may provide information of the determined control file 118-1-n to log reader 122. In another example, log read API 114 may provide information of the determined control file 118-1-n together with the information of incremental sub-control files 128 to log reader 122. Log reader 122 may receive information of the determined optimal control file from log read API 114 to access the logged history of database 110.

Figure 3:
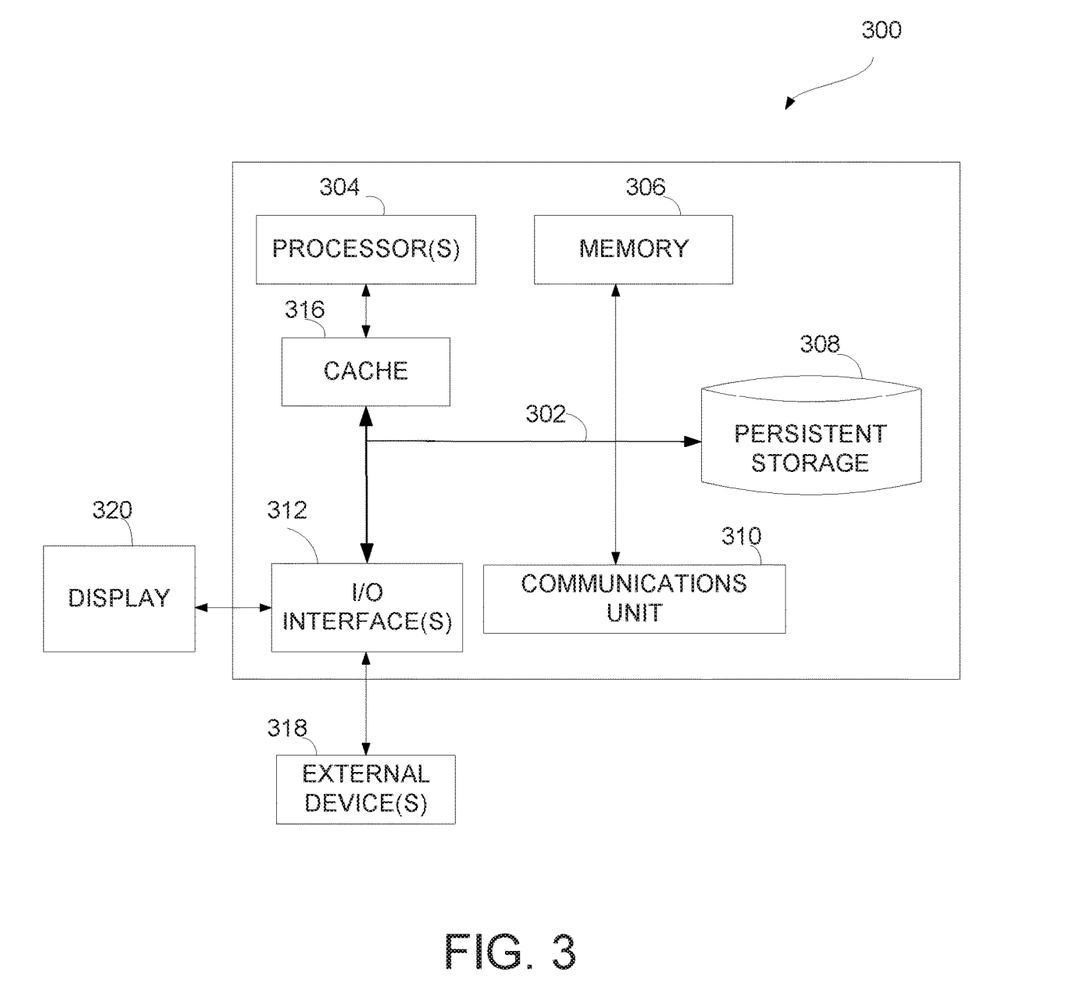
FIG. 3 is a block diagram of components of the database server and a computing device of FIG. 1, in accordance with an embodiment of the present disclosure.

FIG. 3 depicts a block diagram 300 of components of database server 102 and computing device 104 in accordance with an illustrative embodiment of the present disclosure. It should be appreciated that FIG. 3 provides only an illustration of one implementation and does not imply any limitations with regard to the environments in which different embodiments may be implemented. Many modifications to the depicted environment may be made.

Database server 102 and computing device 104 may include communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Log control management 112 may be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Log control management 112 may be downloaded to persistent storage 308 through communications unit 310.

I/O interface(s) 312 allows for input and output of data with other devices that may be connected to database server 102 and/or computing device 104. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., log control management 112 can be stored on such portable computer readable storage media and can be loaded onto persistent storage 308 via I/O interface(s) 312. I/O interface(s) 312 also connect to display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
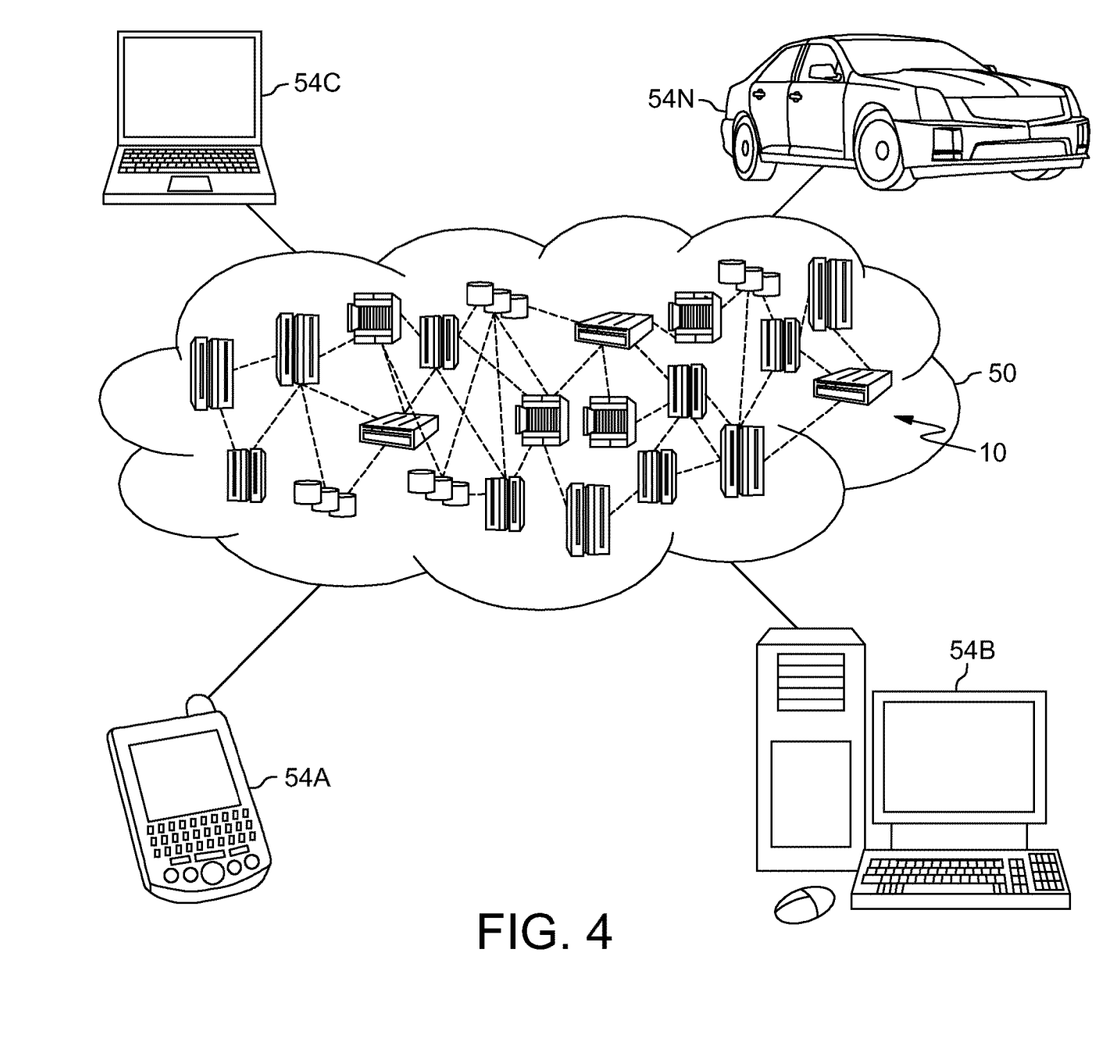
FIG. 4 depicts an embodiment of a cloud computing environment in accordance with the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 5:
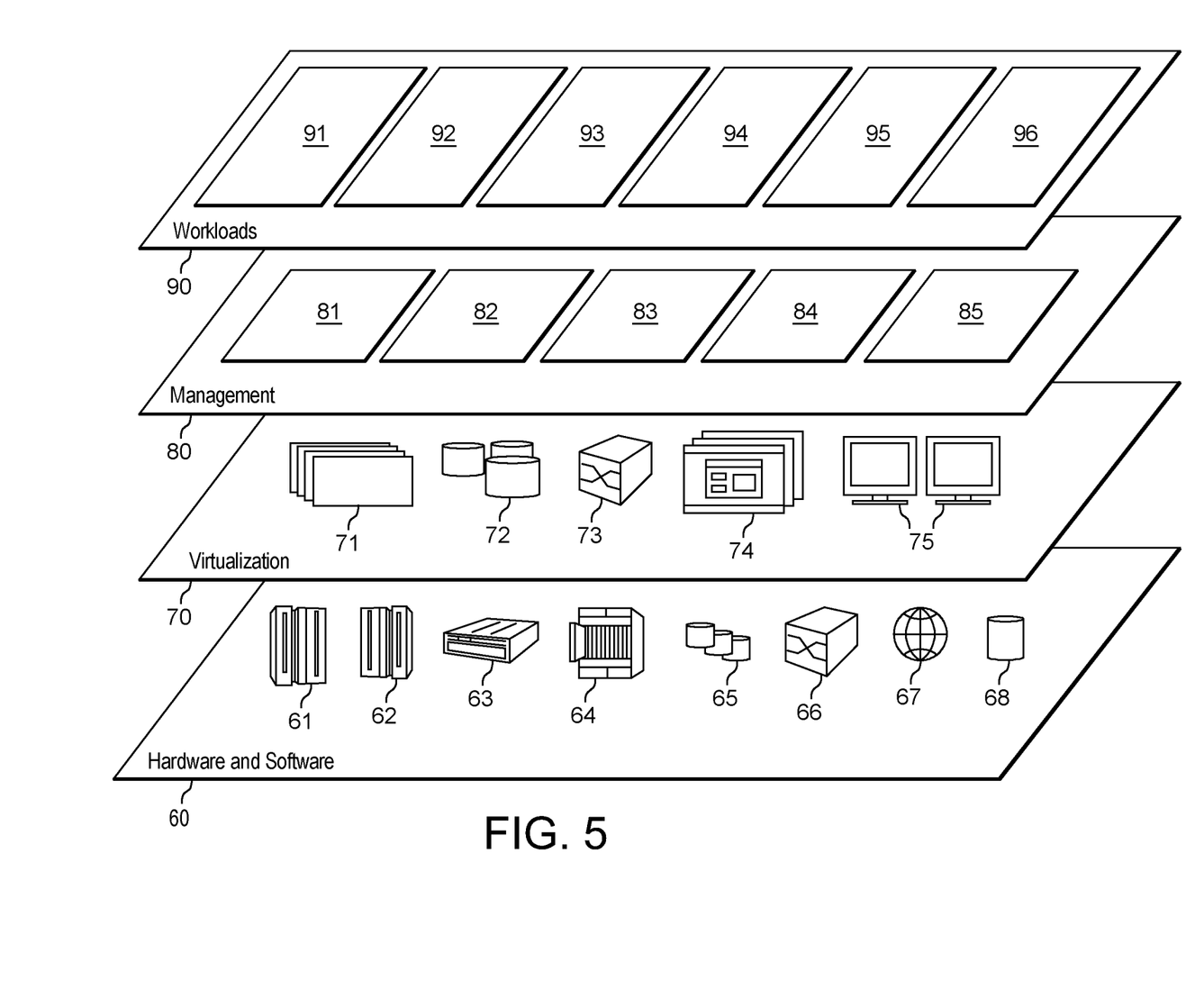
FIG. 5 depicts an embodiment of abstraction model layers of a cloud computing environment, in accordance with the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, log control management 112 as described above with respect to database log management and log access performance improvement environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   receiving, by one or more processors, an access request to a database from an application programming interface (API) for a log reader to minimize a database access performance impact;
   monitoring, by one or more processors, usage of a plurality of control files for the database, wherein each of the plurality of control files is a binary file that contains database information and records a physical structure of the database;
   determining, by one or more processors, an optimal control file based on the usage of the plurality of control files for the database by dynamically locating a least used control file;
   outputting, by one or more processors, the optimal control file to the log reader to access the database through the API; and
   providing, by one or more processors, an incremental sub-control file of the optimal control file to the log reader, the incremental sub-control file being an incremental view of the optimal control file to query incremental log data in the database, wherein the optimal control file includes two or more incremental sub-control files, each of the two or more incremental sub-control files being an incremental view of the optimal control file to query the incremental log data in the database.

2. The computer-implemented method of claim 1, further comprising:
   querying, by one or more processors, the incremental sub-control file of the optimal control file.

3. The computer-implemented method of claim 1, wherein each of the plurality of control files includes a logged history of the database.

4. The computer-implemented method of claim 1, wherein the plurality of control files includes one or more control files for database production usage and one or more control files for database log-based replication usage.

5. A computer program product comprising:
   one or more computer readable storage media, and program instructions collectively stored on the one or more computer readable storage media, the program instructions comprising:

program instructions to receive an access request to a database from an application programming interface (API) for a log reader to minimize a database access performance impact;

program instructions to monitor usage of a plurality of control files for the database, wherein each of the plurality of control files is a binary file that contains database information and records a physical structure of the database;

program instructions to determine an optimal control file based on the usage of the plurality of control files for the database by dynamically locating a least used control file;

program instructions to output the optimal control file to the log reader to access the database through the API; and program instructions to provide an incremental sub-control file of the optimal control file to the log reader, the incremental sub-control file being an incremental view of the optimal control file to query incremental log data in the database, wherein the optimal control file includes two or more incremental sub-control files, each of the two or more incremental sub-control files being an incremental view of the optimal control file to query the incremental log data in the database.

6. The computer program product of claim 5, further comprising:

program instructions, stored on the one or more computer-readable storage media, to query the incremental sub-control file of the optimal control file.

7. The computer program product of claim 5, wherein each of the plurality of control files includes a logged history of the database.

8. The computer program product of claim 5, wherein the plurality of control files includes one or more control files for database production usage and one or more control files for database log-based replication usage.

9. A computer system comprising:

one or more computer processors, one or more computer readable storage media, and program instructions stored on the one or more computer readable storage media for execution by at least one of the one or more computer processors, the program instructions comprising:

program instructions to receive an access request to a database from an application programming interface (API) for a log reader to minimize a database access performance impact;

program instructions to monitor usage of a plurality of control files for the database, wherein each of the plurality of control files is a binary file that contains database information and records a physical structure of the database;

program instructions to determine an optimal control file based on the usage of the plurality of control files for the database by dynamically locating a least used control file;

program instructions to output the optimal control file to the log reader to access the database through the API; and program instructions to provide an incremental sub-control file of the optimal control file to the log reader, the incremental sub-control file being an incremental view of the optimal control file to query incremental log data in the database, wherein the optimal control file includes two or more incremental sub-control files, each of the two or more incremental sub-control files being an incremental view of the optimal control file to query the incremental log data in the database.

10. The computer system of claim 9, further comprising:

program instructions, stored on the one or more computer-readable storage media, to query the incremental sub-control file of the optimal control file.

11. The computer system of claim 9, wherein each of the plurality of control files includes a logged history of the database.

* * * * *